(12) United States Patent
Katsuma et al.

(10) Patent No.: US 7,613,098 B2
(45) Date of Patent: Nov. 3, 2009

(54) OBJECTIVE OPTICAL SYSTEM FOR OPTICAL RECORDING MEDIA AND OPTICAL PICKUP DEVICE USING IT

(75) Inventors: Toshiaki Katsuma, Tokyo (JP); Yu Kitahara, Saitama (JP); Masao Mori, Saitama (JP); Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 612 days.

(21) Appl. No.: 11/267,513

(22) Filed: Nov. 7, 2005

(65) Prior Publication Data
US 2006/0098555 A1 May 11, 2006

(30) Foreign Application Priority Data
Nov. 8, 2004 (JP) .............................. 2004-323421

(51) Int. Cl.
*G11B 7/00* (2006.01)
(52) U.S. Cl. ............................. 369/112.22; 369/112.25; 369/112.04; 369/112.12; 359/665; 359/290
(58) Field of Classification Search ................. 369/112, 369/112.22, 112.25, 112.04, 112.12; 359/665, 359/290
See application file for complete search history.

(56) References Cited

U.S. PATENT DOCUMENTS

| | | | |
|---|---|---|---|
| 4,190,330 A | 2/1980 | Berreman | |
| 4,564,267 A | 1/1986 | Nishimoto | |
| 4,601,545 A | 7/1986 | Kern | |
| 4,783,152 A | 11/1988 | Nishimoto | |
| 5,150,234 A * | 9/1992 | Takahashi et al. ............... | 349/1 |
| 5,905,708 A | 5/1999 | Richter | |
| 6,236,493 B1 | 5/2001 | Schmidt et al. | |
| 6,781,815 B2 * | 8/2004 | Kurumisawa ............... | 361/302 |
| 7,088,917 B2 * | 8/2006 | Butterworth ................. | 396/89 |
| 7,215,480 B2 * | 5/2007 | Ito et al. ...................... | 359/666 |
| 7,245,407 B2 * | 7/2007 | Komma ........................ | 359/15 |
| 2002/0018407 A1 * | 2/2002 | Komoto .................... | 369/44.23 |
| 2003/0185134 A1 * | 10/2003 | Kimura et al. ......... | 369/112.08 |

(Continued)

FOREIGN PATENT DOCUMENTS

JP    H05-54414    3/1993

(Continued)

*Primary Examiner*—Wayne R Young
*Assistant Examiner*—Linh T Nguyen
(74) *Attorney, Agent, or Firm*—Arnold International; Jon W. Henry; Bruce Y. Arnold (57) ABSTRACT

An objective optical system focuses light from a light source onto at least two different types of optical recording media having different substrate thicknesses in order to record or reproduce information on the optical recording media by using a variable refractive power element and an objective lens. The variable refractive power element may be a liquid crystal element with concentric zones that serves as a transparent plate having no convergence effect when no voltage is applied when selecting an AOD, DVD, or CD and as a converging lens when a voltage is applied when selecting a BD. Alternately, the variable refractive power element may electrically vary the refractive index of a nanoparticle dispersion or at least one liquid of a two-liquid lens element. A diffractive optical element may be used to assist in focusing light to four recording media. An optical pickup device includes the objective optical system.

4 Claims, 6 Drawing Sheets

U.S. PATENT DOCUMENTS

| | | |
|---|---|---|
| 2004/0021929 A1* | 2/2004 | Nishioka et al. ............ 359/319 |
| 2005/0030878 A1* | 2/2005 | Park et al. .............. 369/112.08 |
| 2005/0185560 A1* | 8/2005 | Kim et al. ..................... 369/94 |
| 2006/0050404 A1* | 3/2006 | Liao ........................... 359/680 |
| 2006/0056042 A1* | 3/2006 | Kim et al. ................... 359/666 |
| 2006/0077794 A1 | 4/2006 | Katsuma et al. |
| 2006/0077861 A1 | 4/2006 | Katsuma et al. |

FOREIGN PATENT DOCUMENTS

| | | |
|---|---|---|
| JP | H06-302008 | 10/1994 |
| JP | H07-105566 | 4/1995 |
| JP | H10-143906 | 5/1998 |
| JP | H10-269599 | 10/1998 |
| JP | 2005-93030 | 4/2005 |
| JP | 2005-100586 | 4/2005 |
| JP | 2005-149626 | 6/2005 |
| JP | 2005-158213 | 6/2005 |
| JP | 2005-190620 | 7/2005 |

* cited by examiner

State under a large voltage applied
Fig. 6A

State under a small voltage applied
Fig. 6B

State under a voltage applied
Fig. 7A

State under no voltage applied
Fig. 7B

OBJECTIVE OPTICAL SYSTEM FOR OPTICAL RECORDING MEDIA AND OPTICAL PICKUP DEVICE USING IT

TECHNICAL FIELD OF THE INVENTION

The present invention relates to an objective optical system for optical recording media that, when recording or reproducing information, efficiently focuses light of different wavelengths onto an appropriate corresponding recording medium according to standardized characteristics such as the numerical aperture of the objective optical system used, the wavelength of the light selected, and the substrate thickness of the optical recording medium. The objective optical system focuses light beams with the same or nearly the same wavelengths onto different optical recording media with different characteristics, such as substrate thicknesses. The present invention also relates to an optical pickup device that uses such an objective optical system.

BACKGROUND OF THE INVENTION

In response to the recent development of various optical recording media, optical pickup devices that can carry out recording and reproducing using two alternative types of optical recording media have been known. For example, devices that record or reproduce information with either a DVD (Digital Versatile Disk) or a CD (Compact Disk including CD-ROM, CD-R, CD-RW) have been practically used. Furthermore, the DVD, in order to improve the recording density, is designed to use visible light with a wavelength of approximately 658 nm. In contrast, because there are also optical recording media that do not have any sensitivity to light in the visible light region, near-infrared light with a wavelength of approximately 784 nm is used for the CD. Further, in these two optical recording media, it is necessary to differentiate the numerical apertures (NA) due to the differences in the characteristics of the two optical recording media. Additionally, the substrate thickness, that is, the geometric thickness of a protective layer formed with PC (polycarbonate), of each of the two different optical recording media is standardized to a different thickness. For example, the substrate thickness of the DVD is 0.6 mm and the substrate thickness of the CD is 1.2 mm. In addition, a semiconductor laser with a short wavelength (for example, that emits a laser beam with a wavelength of 408 nm) using a GaN substrate has been put into practical use, and in response to the demand for increasing recording capacity, AODs (Advanced Optical Disks), also known as HD-DVDs, that provide approximately 20 GB of data storage on a single layer of a single side of an optical disk by using this short wavelength light is about to be put into practical use. Further, a Blu-ray Disc (hereafter, referred to as 'BD') where a light with a short wavelength is used as an irradiation light similar to the AOD is almost ready to be put into practical use.

In the standards for AODs, the numerical aperture and the substrate thickness are standardized to the same values as those of DVDs, specifically a numerical aperture (NA) of 0.65 and a substrate thickness of 0.6 mm. In contrast, in the standards for BDs (Blu-ray disk systems), the numerical aperture (NA) and the substrate thickness are standardized to be completely different values from the values for DVDs and CDs. Specifically, for BDs, the standard numerical aperture (NA) is 0.85 and the standard substrate thickness is 0.1 mm.

Therefore, an optical pickup device wherein any of three optical recording media (namely, an AOD, DVD and CD, or a BD, DVD and CD) can be used, has also been progressing.

As described above, with these optical recording media, because the standardized wavelengths and substrate thicknesses differ from one another depending upon the type of optical recording medium being used, the spherical aberration generated by the substrates differs based on differences in thicknesses of the substrates (protective layers). Therefore, in these optical pickup devices, because it is necessary to optimize the spherical aberration relative to the light beams of various wavelengths in order to assure a proper focus onto the different recording media for recording or reproducing information, it is necessary to devise a lens configuration that has a different light convergence or divergence effect on each of the optical recording media for the objective lens for optical recording media mounted in these devices.

Applicants of the present invention have already suggested various objective lenses for optical recording media in the specifications of Japanese Laid-Open Patent Applications 2005-190620, 2005-158213, 2005-093030, 2005-149626 and 2005-100586. In the objective lenses for optical recording media of the Japanese applications listed above, light beams of different wavelengths are focused on the recording medium of each of the CD, the DVD, and the AOD (or the BD). This is achieved, for example, using an objective optical system for optical recording media that includes a diffractive surface, which has wavelength selectivity, and an objective lens in order to achieve optimization of correction of spherical aberrations generated by differences in the thicknesses of the substrates (protective layers) of the optical recording media by using the difference in the wavelengths of the operating light beams for the CD, DVD, and AOD (or BD).

As described above, because AODs and BDs are approaching practical use, there is a demand to be able to record and reproduce information using four types of optical recording media, that is, using AODs and BDs, in addition to CDs and DVDs, as the optical recording media using a single objective lens.

However, as described above, light beams with the same wavelength, or very nearly the same wavelength, for example, 408 nm or very nearly 408 nm, are used for both AODs and BDs, and according to the teachings of the Japanese applications listed above, where the light convergence or divergence effects are changed based on differences in wavelengths of the light beams being used, the use of the same wavelength, or very nearly the same wavelength, does not support using both a BD and an AOD with a single objective lens.

Therefore, it is necessary to adopt new concepts in order to realize an objective optical system for optical recording media that can be used for at least both an AOD and a BD.

BRIEF SUMMARY OF THE INVENTION

The present invention relates to an objective optical system for optical recording media that can efficiently focus light beams of the same wavelength, or very nearly the same wavelength, on different recording media with different technical standards of the substrate thickness. The present invention further relates to an optical pickup device that uses such an objective optical system.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an objective optical system for optical recording media that can be used to focus each of four light beams of four wavelengths, $\lambda 1$, $\lambda 2$, $\lambda 3$, and $\lambda 4$ from a light source to a different desired position for each of first, second, third, and fourth optical recording media of substrate thicknesses, T1, T2, T3, and T4, respectively, for recording and reproducing information. As herein defined, unless otherwise indicated, the term "light source" refers to the source of the four different light beams of at least four wavelengths (but not necessarily four different wavelengths), whether the light beams originate from a single light-emitting source or from separate light-emitting sources, such as semiconductor lasers. Additionally, the term "light source" may also include various optical elements, including beamsplitters, mirrors, and converging lenses, which for one or more of the light beams of wavelengths $\lambda 1$, $\lambda 2$, $\lambda 3$, and $\lambda 4$ may operate as a collimator lens to provide a collimated light beam incident on the objective optical system.

The objective optical system for optical recording media includes, in order from the light source side: a variable refractive power element; diffractive optics with at least one surface of the diffractive optics being a diffractive surface defined by a phase function $\Phi$, as will be discussed in detail later; and an objective lens of positive refractive power with both surfaces being rotationally symmetric aspheric surfaces. The phase function $\Phi$ is chosen so that the objective optical system for optical recording media is able to focus each of the four light beams of four wavelengths, $\lambda 1$, $\lambda 2$, $\lambda 3$, and $\lambda 4$, at a different desired position for each of the first, second, third and fourth optical recording media of substrate thicknesses, T1, T2, T3, and T4, respectively.

The objective optical system for optical recording media is constructed so that collimated light of each wavelength, $\lambda 1$, $\lambda 2$, $\lambda 3$, and $\lambda 4$, diffracted by the diffractive optical element is efficiently focused onto the desired position of the corresponding optical recording media of substrate thickness, T1, T2, T3, and T4, respectively. In order for this to occur at all wavelengths, preferably the diffraction order of the diffracted light of at least one wavelength is different from the diffraction order of the diffracted light of at least one other wavelength.

Additionally, numerical apertures NA1, NA2, NA3, and NA4 of the objective optical system are associated with the wavelengths $\lambda 1$, $\lambda 2$, $\lambda 3$, and $\lambda 4$, respectively, and the substrate thicknesses T1, T2, T3, and T4, respectively, of the four optical recording media.

In summary, throughout the following descriptions the following definitions apply:

NA1 is the numerical aperture of the objective optical system for light of the first wavelength $\lambda 1$ that is focused on the optical recording medium of substrate thickness T1;

NA2 is the numerical aperture of the objective optical system for light of the second wavelength $\lambda 2$ that is focused on the optical recording medium of substrate thickness T2;

NA3 is the numerical aperture of the objective optical system for light of the third wavelength $\lambda 3$ that is focused on the optical recording medium of substrate thickness T3; and NA4 is the numerical aperture of the objective optical system for light of the fourth wavelength $\lambda 4$ that is focused on the optical recording medium of substrate thickness T4.

Additionally, in the objective optical system for optical recording media of the present invention, light beams of two wavelengths among the wavelengths $\lambda 1$, $\lambda 2$, $\lambda 3$, and $\lambda 4$ are the same or very nearly the same. The phrase "the same wavelength or very nearly the same wavelength" means that the wavelengths may be considered the same, that is, equal to one another, for purposes of design, construction, and operation of the objective optical system. Furthermore, as exemplary and in accordance with the current use of wavelengths of light beams in objective optical systems for optical recording media, the wavelengths that are the same are taken as shorter wavelengths than the other two of the four wavelengths so that the following conditions are satisfied:

$$\lambda 1 = \lambda 4 < \lambda 2 < \lambda 3 \quad \text{Condition (1)}$$

$$NA4 > NA1 \geqq NA2 > NA3 \quad \text{Condition (2)}$$

$$T4 < T1 \leqq T2 < T3 \quad \text{Condition (3).}$$

Figure 1A:
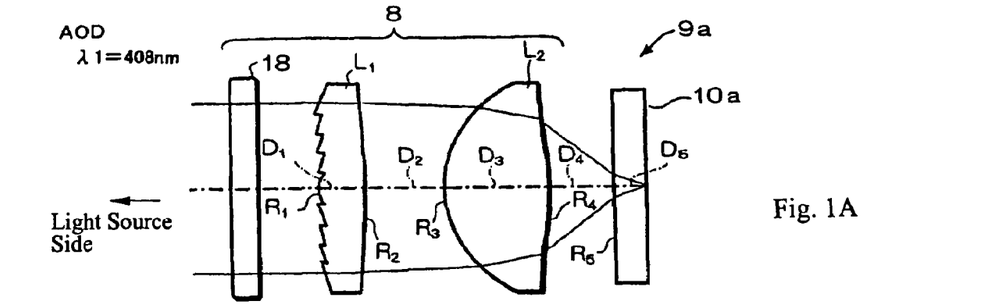
FIGS. 1A-1D are schematic diagrams that depict cross-sectional views of the objective optical system for optical recording media of Embodiment 1 of the present invention, with FIG. 1A showing the operation of the objective optical system when used with a first optical recording medium 9a, with FIG. 1B showing the operation of the objective optical system when used with a second optical recording medium 9b, with FIG. 1C showing the operation of the objective optical system when used with a third optical recording medium 9c, and with FIG. 1D showing the operation of the objective optical system when used with a fourth optical recording medium 9d.
Figure 5A:
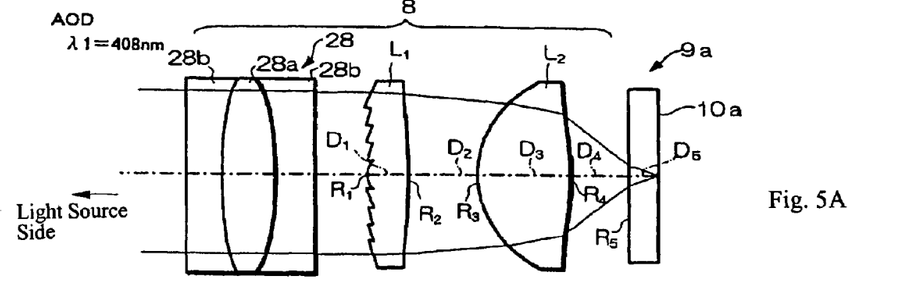
FIGS. 5A-5D are schematic diagrams that depict cross-sectional views of the objective optical system for optical recording media of Embodiment 2 of the present invention, with FIG. 5A showing the operation of the objective optical system when used with a first optical recording medium 9a, with FIG. 5B showing the operation of the objective optical system when used with a second optical recording medium 9b, with FIG. 5C showing the operation of the objective optical system when used with a third optical recording medium 9c, and with FIG. 5D showing the operation of the objective optical system when used with a fourth optical recording medium 9d.

The invention will now be discussed in general terms with reference to FIGS. 1A-1D that show the geometry of the objective optical system for optical recording media of Embodiment 1 of the present invention and FIG. 3 that shows an optical pickup device using the objective optical system for optical recording media of this embodiment. The figures show the elements of the objective optical system schematically. In FIG. 1A, radii of curvature of the surfaces of the various optical elements, including the lens surfaces, are referenced by the letter R with a subscript denoting their order from the light source side of the objective optical system, from $R_1$ to $R_5$. The on-axis surface spacings along the optical axis of the various optical surfaces are referenced by the letter D with a subscript denoting their order from the light source side of the objective optical system, from $D_1$ to $D_5$. In FIG. 5A that shows Embodiment 2, the radii of curvature $R_1$ to $R_5$ and the on-axis surface spacings $D_1$ to $D_5$ are similarly indicated. In order to prevent FIG. 3 from being too complicated, only one pair of light rays of each light beam are illustrated at every location of the optical pickup device in FIG. 3, even where light of more than one wavelength is present, including at the prisms 2a and 2b. Additionally, in FIGS. 1A-1D and FIG. 3, a diffractive surface is shown as exaggerated in terms of an actual serrated shape in order to more clearly show the diffractive nature of the surface. FIG. 2 is a schematic diagram of the variable refractive power element of the objective optical system for optical recording media of Embodiment 1 shown in FIGS. 1A-1D.

Figure 3:
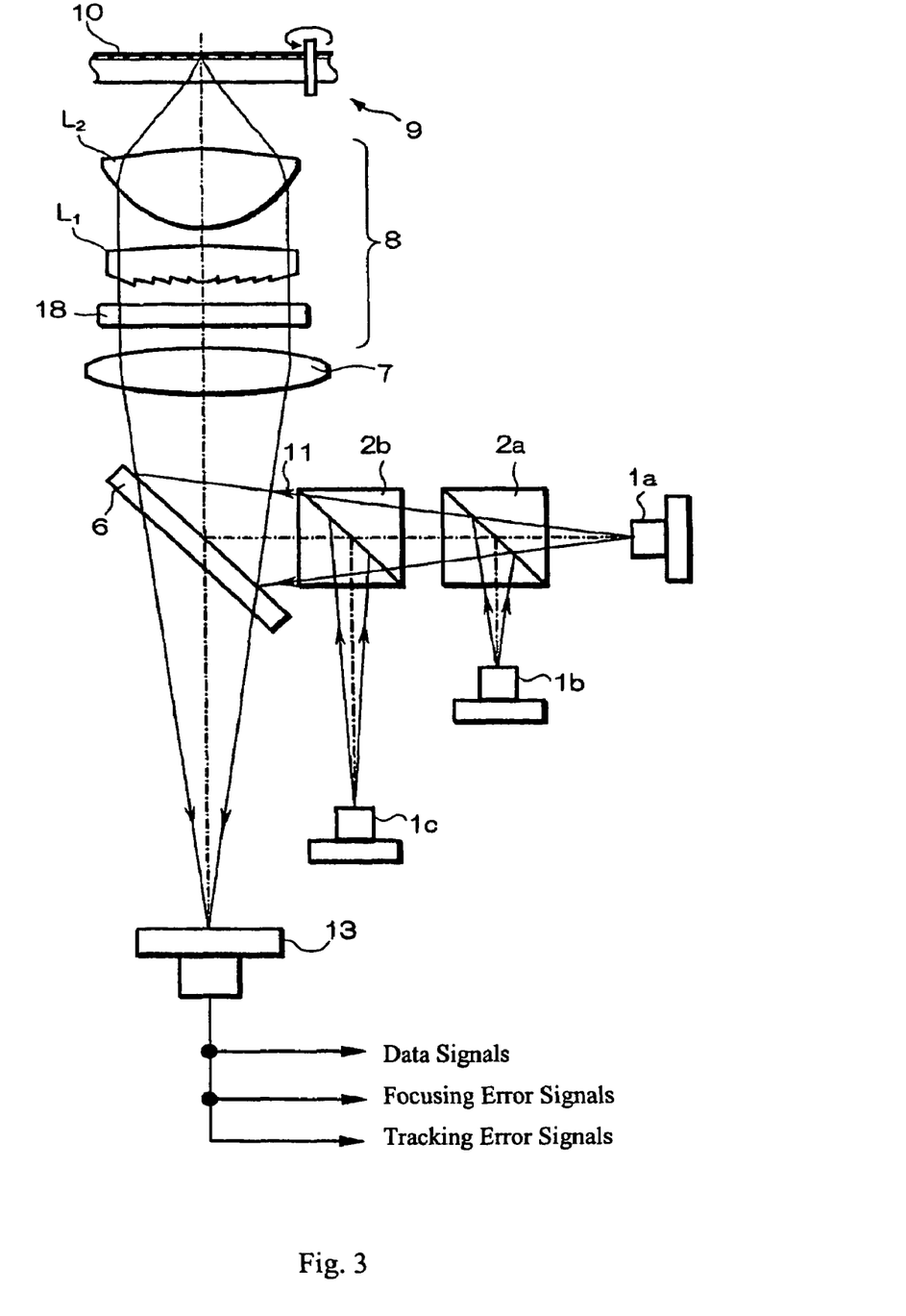
FIG. 3 is a schematic diagram of an optical pickup device using the objective optical system for optical recording media of FIGS. 1A-1D.

As shown in FIG. 3, a laser beam 11 that is emitted from one of the semiconductor lasers 1a, 1b, and 1c is reflected by a half mirror 6, is collimated by a collimator lens 7, and is focused by the objective optical system 8 onto a recording area 10 of an optical recording medium 9. Hereinafter, the term "collimated" means that any divergence or convergence of the light beam is so small that it can be neglected in computing the image-forming properties of the objective optical system 8 for the light beam. The laser beam 11 is converted to a convergent beam by the objective optical system 8 so that it is focused onto the recording region 10 of the optical recording medium 9.

Figure 1B:
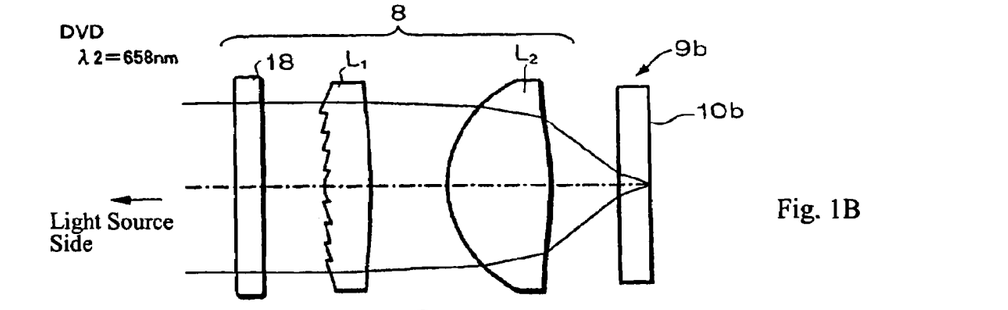
Figure 1C:
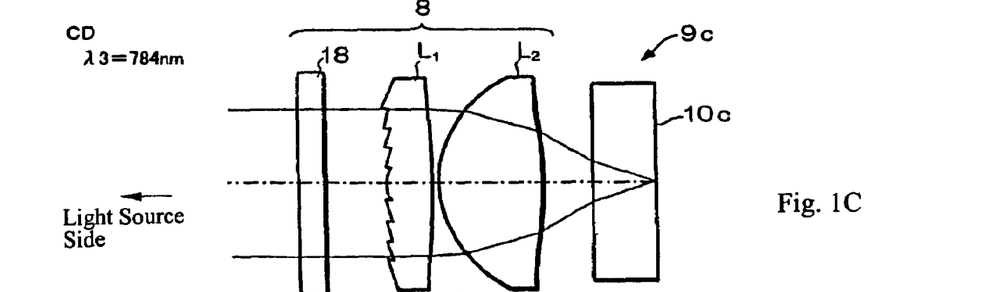
Figure 1D:
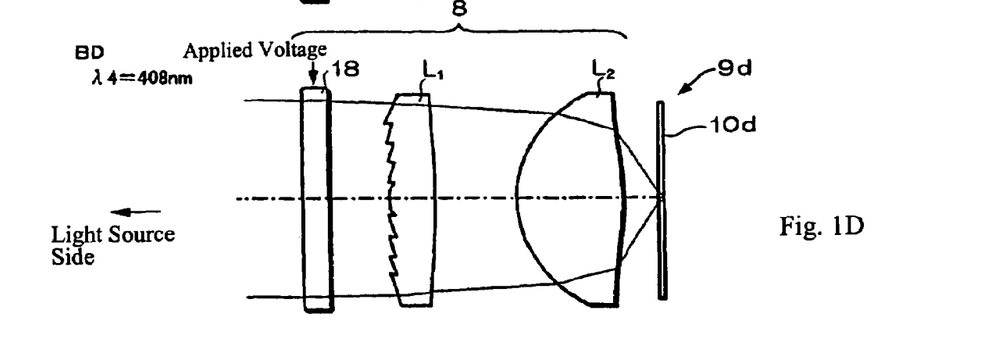
Figure 2:
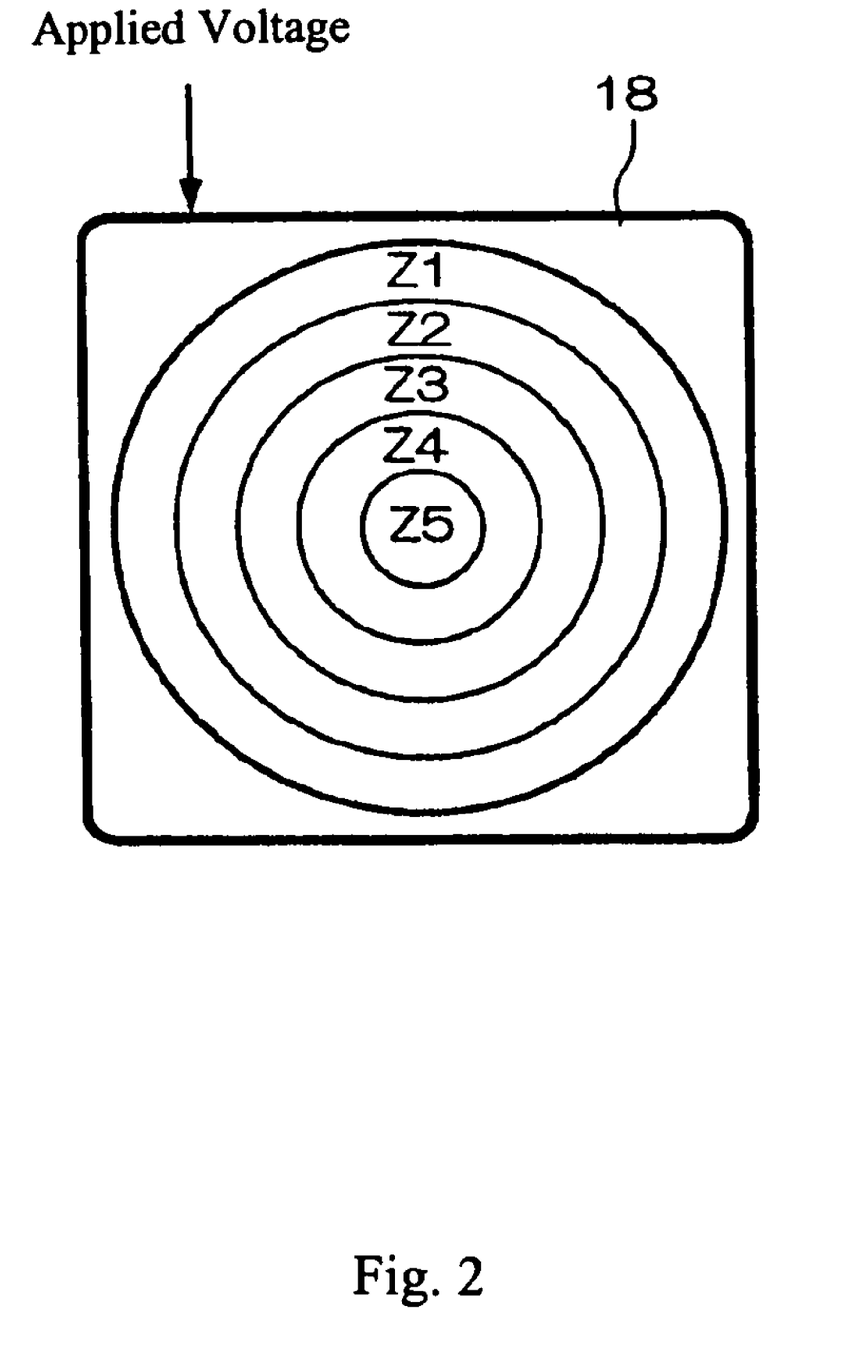
FIG. 2 is a schematic diagram of the variable refractive power element of the objective optical system for optical recording media of Embodiment 1 shown in FIGS. 1A-1D.

More specifically, as shown in FIGS. 1A-1D, the arrangement includes an optical recording medium 9a that is an AOD with a substrate thickness T1 of 0.6 mm used with a light beam of wavelength λ1 that is equal to 408 nm and with a numerical aperture NA1 of 0.65 (FIG. 1A), an optical recording medium 9b that is a DVD with a substrate thickness T2 of 0.6 mm used with a light beam of wavelength λ2 that is equal to 658 nm and with a numerical aperture NA2 of 0.65 (FIG. 1B), an optical recording medium 9c that is a CD with a substrate thickness T3 of 1.2 mm used with a light beam of wavelength λ3 that is equal to 784 nm and with a numerical aperture NA3 of 0.50 (FIG. 1C), and an optical recording medium 9d that is a BD with a substrate thickness T4 of 0.1 mm used with a light beam of wavelength λ4 that is equal to 408 nm and with a numerical aperture NA4 of 0.85 (FIG. 1D).

The semiconductor laser 1a emits the visible laser beam having the wavelength of approximately 408 nm (λ1 and λ4) for AODs and BDs. The semiconductor laser 1b emits the visible laser beam having the wavelength of approximately 658 nm (λ2) for DVDs. The semiconductor laser 1c emits the near-infrared laser beam having the wavelength of approximately 784 nm (λ3) for CDs such as CD-R (recordable optical recording media) (hereinafter the term CD generally represents CDs of all types).

The arrangement of FIG. 3 does not preclude semiconductor lasers 1a-1c providing simultaneous outputs. However, it is preferable that the lasers be used alternately depending on whether the optical recording medium 9 of FIG. 3 is specifically, as shown in FIGS. 1A-1D, an AOD 9a, a DVD 9b, a CD 9c, or a BD 9d. As shown in FIG. 3, the laser beam 11 transmitted from the semiconductor lasers 1a and 1b are irradiated onto the half mirror 6 via the prisms 2a and 2b and the laser beam 11 transmitted from the semiconductor laser 1c is irradiated onto the half mirror 6 via the prism 2b.

The collimator lens 7 is schematically shown in FIG. 3 as a single lens element. However, it may be desirable to use a collimator lens made up of more than one lens element in order to better correct chromatic aberration of the collimator lens 7. In general, the constitution of the objective optical system for optical recording media is illustrated as simply as possible in terms of lens elements in FIGS. 1A-1D.

In the optical pickup device of the present invention, each of the optical recording media 9, as shown in FIG. 3, whether an AOD 9a, a DVD 9b, a CD 9c, or a BD 9d, as shown in FIGS. 1A-1D, respectively, must be arranged at a predetermined position along the optical axis, for example, on a turntable, so that the recording region 10 of FIG. 3 (one of recording regions 10a, 10b, 10c, and 10d of an AOD 9a, a DVD 9b, a CD 9c, and a BD 9d of FIGS. 1A-1D, respectively) is positioned at the focus of the light beam of the corresponding wavelength (λ1, λ2, λ3, and λ4 for recording regions 10a, 10b, 10c, and 10d, respectively) in order to properly record signals and reproduce recorded signals. The light beams enter the objective optical system 8 for optical recording media as collimated light so that the objective optical system 8 operates with an infinite conjugate on the light source side. Due to the diffractive effects and the refractive effects of the variable refractive power element 18, the diffractive optics $L_1$, and the objective lens $L_2$, each light beam is efficiently focused on the appropriate corresponding recording medium, AOD 9a as shown in FIG. 1A, DVD 9b as shown in FIG. 1B, CD 9c as shown in FIG. 1C, or BD 9d as shown in FIG. 1D.

In the recording region 10, pits carrying signal information are arranged in tracks. The reflected light of a laser beam 11 from the recording region 10 is made incident onto the half mirror 6 by way of the objective optical system 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are converted to electrical signals that are operated on by calculating circuits (not shown in the drawings) in order to obtain data signals and respective error signals for focusing and tracking.

Because the half mirror 6 is inserted into the optical path of the return light from the optical recording media 9 at a forty-five degree angle to the optical axis, the half mirror 6 introduces astigmatism into the light beam, as a cylindrical lens may introduce astigmatism, whereby the amount of focusing error may be determined according to the form of the beam spot of the return light on the four-part photodiode 13. Also, a grating may be inserted between the semiconductor lasers 1a-1c and the half mirror 6 so that tracking errors can be detected using three beams.

As shown in FIGS. 1A-1D and FIG. 3, the objective optical system 8 for optical recording media of the present invention includes, in order from the light source side, variable refractive power element 18, diffractive optical element $L_1$ that includes at least one diffractive surface, and objective lens $L_2$ having positive refractive power, which is on the recording media side of the objective optical system. The refractive power of the variable refractive power element 18 can be changed according to the operating light beam being used for recording or reproducing information. The variable refractive power element 18 is a liquid crystal element as shown in FIG. 2 that serves as a zoned converging lens when a voltage is applied and serves as a transparent plate having no converging effect when no voltage is applied.

For example, as shown in FIGS. 1A-1D, the variable refractive power element 18 has no voltage applied and, therefore, it has no refractive power when the AOD 9a is selected. On the other hand, when the BD 9d is selected, the variable refractive power element 18 has a voltage applied and, therefore, has positive refractive power. Thus, the operating beam output from the variable refractive power element 18 can be focused on each recording area 10. The light beams of wavelengths nearly equal to each other can be successfully focused on the respective recording area 10 of the AOD 9a having a substrate thickness of 0.6 mm and the BD 9d having a substrate thickness of 0.1 mm with spherical aberrations being suppressed.

The AOD 9a and BD 9d work with light beams of wavelengths that are the same wavelength or very nearly the same wavelength. It is difficult to apply them to the prior art technique in which the refractive and diffractive effects of the objective optical system for optical recording media are changed according to operating beam wavelengths so as to change the convergence and point of focus. Therefore, the teachings of the present invention concerning the same or very nearly the same operating beam wavelengths is particularly useful.

In the present invention, the refractive power can be changed between when at least one of the at least two specific types of optical recording media is selected and when at least one of the other optical recording media is selected. The objective optical system for optical recording media of the present invention is shared by multiple optical recording media, characterized by the fact that among the multiple optical recording media, at least two specific types of optical recording media work with light beams of the same wavelength or very nearly the same wavelength but with recording media having substrate thicknesses different from each other. This is achieved by using a variable refractive power element along with an objective lens of a specific construction in the objective optical system. In other words, for example, for two types of optical recording media having substrate thicknesses different from each other, the attempt to reduce spherical aberration in recording information on, or reproducing information from, one of the optical recording media generally results in excessively increasing spherical aberration in recording information on, or reproducing information from, the other optical recording medium. Therefore, in the present invention, the refractive power of the variable refractive power element is changed according to the type of optical recording medium selected so that the objective optical system prevents this excessively increased spherical aberration in recording information on, or reproducing information from, the other optical recording medium. In this way, the operating light beams can be efficiently focused on multiple optical recording media including optical recording media working with operating beams of the same or very nearly the same wavelength, but with recording media having substantially different substrate thicknesses. In particular, in the present invention, the refractive power of the variable refractive power element may be varied so as to compensate for differences in spherical aberration of the objective optical system for the foci of the light focused on said at least two different types of optical recording media due to their different substrate thicknesses. The optical pickup device of the present invention uses such an objective optical system of the present invention with a simple configuration.

The present invention can be applied to multiple optical recording media working with operating beams of wavelengths that are different from each other as well as with multiple optical recording media working with operating beams of wavelengths that are the same wavelength or very nearly the same wavelength.

In the embodiment shown in FIGS. 1A-1D, the variable refractive power element 18 has no voltage applied and, therefore, has no refractive power for the operating beams of the DVD 9b and the CD 9c. The operating beams are successfully focused on the respective recording areas 10b and 10c of the DVD 9b and CD 9c in recording and reproducing information.

The variable refractive power element of the objective optical system for optical recording media of the present invention can use various devices with refractive power that change according to the types of optical recording media being used. Some embodiments and modified embodiments of these various devices are described below. The variable refractive power element is not restricted to any narrow definition of optical structures associated with various disclosed embodiments, but rather the term variable refractive power element includes various elements that can change wavefronts in the manner that wavefronts leave the element in different forms even if they enter the element in the same form.

In the embodiment shown in FIGS. 1A-1D, the objective optical system 8 for optical recording media operates with the variable refractive power element 18 having no refractive power for the three optical recording media 9a (AOD), 9b (DVD), and 9c (CD). The distance $D_2$ between the diffractive optical element $L_1$ and the objective lens $L_2$ in recording and reproducing information on the AOD 9a (see FIG. 1A) is nearly equal to that in recording and reproducing information on the DVD 9b (see FIG. 1B), and which has nearly the same substrate thickness of 0.6 mm as the AOD 9a. However, the space $D_2$ between the diffractive optical element $L_1$ and the objective lens $L_2$ is smaller in recording and reproducing information on the CD 9c, which has a larger substrate thickness of 1.2 mm (see FIG. 1C).

According to the present invention, changing the separation between the diffractive optical element $L_1$ and the objective lens $L_2$ according to the type of recording medium being used enables collimated light to be incident on the objective optical system 8 for all the optical recording media being used, and also enables light to be focused by the objective optical system 8 for optical recording media at desired predetermined positions with excellent correction of aberrations.

As described above, according to the objective optical system 8 for optical recording media of the present embodiment, even in the case of recording to or reproducing from any one of the optical recording media, AOD 9a, DVD 9b, CD 9c, or BD 9d, the light being used can enter into the objective optical system 8 for optical recording media as collimated light so that the degree of freedom in selecting optical elements of the optical system and arranging these elements can be enhanced, so that a compact device can be obtained, and so that tracking ability can be improved.

In addition, designing the diffractive optical element $L_1$ to have positive refractive power as a whole enables the objective lens $L_2$ to be made smaller, which also results in a smaller size of the entire objective optical system 8 for optical recording media.

Alternately, by designing the diffractive optical element $L_1$ to have negative refractive power as a whole, the operating distance can be made longer, which helps prevent the objective lens $L_2$ from colliding with the optical recording media, for example, a disc optical recording media.

Additionally, the diffractive surface of the diffractive optics $L_1$ preferably is designed so that the diffractive surface diffracts light of maximum intensity for the first wavelength $\lambda 1$ and for the fourth wavelength $\lambda 4$ at a diffraction order that is different from the diffraction order of maximum intensity for the second wavelength λ2 and that is different from the diffraction order of maximum intensity for the third wavelength λ3. The four light beams can be focused to appropriate desired positions with high diffraction efficiency by setting the diffraction orders of maximum intensity diffracted light as described above.

Furthermore, it is preferable that the diffractive surface of the objective optical system 8 for optical recording media of the present invention be formed as a diffractive structure on a 'virtual plane', herein defined as meaning that the surface where the diffractive structure is formed would be planar but for the diffractive structures of the diffractive surface, and that the virtual plane be perpendicular to the optical axis. Preferably, the cross-sectional configuration of the diffractive surface is serrated so as to define a so-called kinoform. FIGS. 1A-1D and FIG. 3 exaggerate the actual size of the serrations of the diffractive surfaces.

The diffractive surface is defined by a phase function Φ. The diffractive surface adds a difference in optical path length equal to $m \cdot \lambda \cdot \Phi/(2\pi)$ to the diffracted light, where λ is the wavelength, Φ is the phase function of the diffractive surface, and m is the order of the diffracted light that is focused on a recording medium 9. The phase function Φ is given by the following equation:

$$\Phi = \Sigma W_i \cdot Y^{2i} \qquad \text{Equation (A)}$$

where

Y is the distance in mm from the optical axis; and $W_i$ is a phase function coefficient, and the summation extends over i.

Furthermore, the specific heights of the serrated steps of the diffractive surface of the diffractive optical element that form diffractive optics $L_1$ are based on ratios of diffracted light of each order for the light beams of wavelengths λ1, λ2, λ3, and λ4. Additionally, the outer diameter of the diffractive surface can be appropriately determined by taking into consideration the numerical aperture (NA) of the objective optical system 8 for optical recording media and the beam diameter of the incident laser beams 11 of each of the used wavelengths.

The diffractive surface of the objective optical system 8 for optical recording media of Embodiment 1, which will be more fully described later, has a diffractive optical element structure on a virtual plane, as described above. However, the serrations of the diffractive surface are depicted in an exaggerated form in FIGS. 1A-1D compared to the actual diffractive surface.

Furthermore, it is preferable that at least one surface of the objective lens $L_2$ of the objective optical system 8 for optical recording media of the present invention be an aspheric surface. It is also preferable that the aspheric surfaces be rotationally symmetric aspheric surfaces defined using the following aspheric equation in order to improve aberration correction for all of the recording media 9a, 9b, 9c, and 9d, and in order to assure proper focusing during both recording and reproducing operations:

$$Z = [(C \cdot Y^2)/\{1 + (1 - K \cdot C^2 \cdot Y^2)^{1/2}\}] + \Sigma A_i \cdot Y^{2i} \qquad \text{Equation (B)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is an aspheric coefficient, and the summation extends over i.

It is preferable that the diffractive surface or diffractive surfaces formed on the diffractive optical element $L_1$ and the rotationally symmetric aspheric surface or surfaces formed on the diffractive optical element $L_1$ and/or the objective lens $L_2$ are determined so as to focus each of the four beams of light with the four wavelengths λ1, λ2, λ3, and λ4 onto a corresponding recording region 10 as shown in FIG. 3 (such as recording regions 10a, 10b, 10c, and 10d as shown in FIGS. 1A-1D, respectively) with excellent correction of aberrations.

Additionally, in the objective optical system 8 for optical recording media of the present invention, either one or both of the diffractive optical element $L_1$ and the objective lens $L_2$ may be made of plastic. Making these optical elements of plastic is advantageous in reducing manufacturing costs and making manufacturing easier, and in making the system lighter, which may assist in high speed recording and replaying. Also, it is especially advantageous to use plastic because this enables using a mold to form the diffractive optical element, which is associated with molding processes that are much easier than many other processes of manufacturing.

Alternately, one or both of the diffractive optical element $L_1$ and the objective lens $L_2$ may be made of glass. Glass is advantageous for several reasons, including the fact that optical properties of glass generally vary less with changing temperature and humidity than for plastic, and the fact that deterioration of the transmissivity is small compared to plastic even when the diffractive optical element $L_1$ and/or the objective lens $L_2$ are used for long periods of time, even when light beams of relatively short wavelengths are used.

Figure 4A:
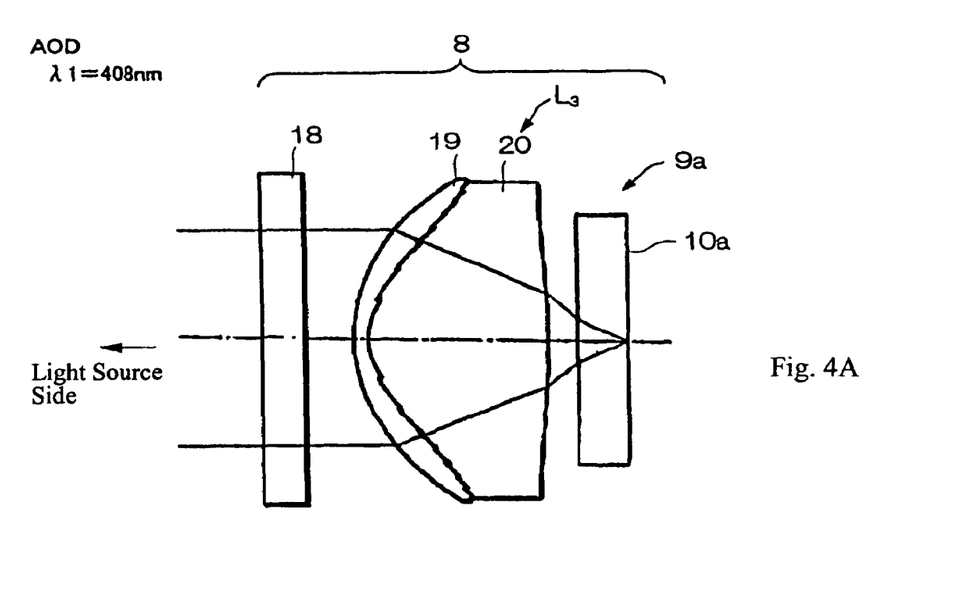
FIGS. 4A and 4B are schematic diagrams that depict cross-sectional views of a modified objective optical system for optical recording media of Embodiment 1 of the present invention.
Figure 4B:
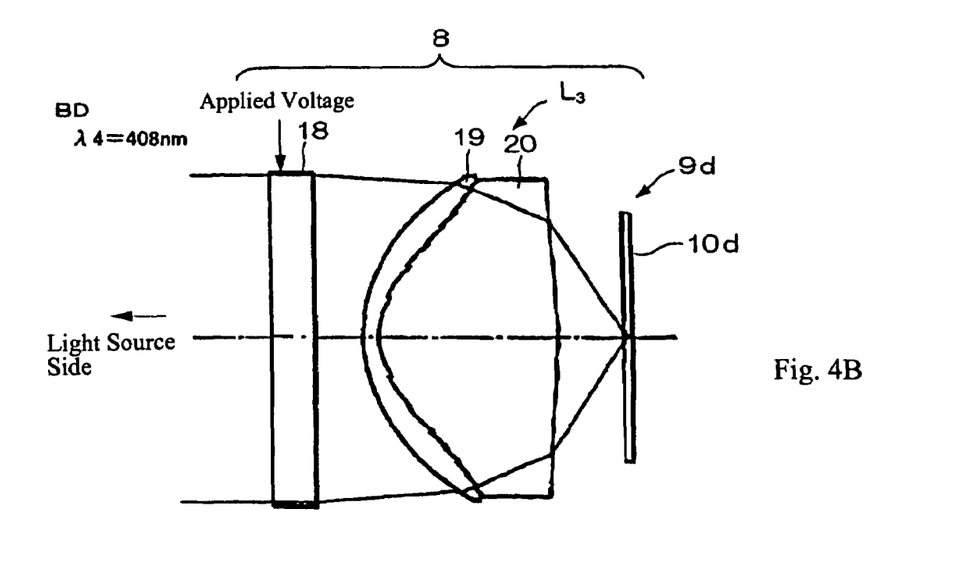

The objective lens in the objective optical system 8 for optical recording media, excluding the variable refractive power element 18, can include multiple lens groups, lens components and lens elements. For example, the objective lens $L_3$ shown in FIGS. 4A-4B, where FIG. 4A shows when an AOD is in use and FIG. 4B shows when a BD is in use, includes a diffractive optical member 19 integrated with an objective lens element 20. This lens configuration is a single lens group, single lens component, two lens element configuration that provides for focusing the operating light beams on the recording area 10a, 10d of each of the respective optical recording media 9a, 9d.

Embodiments 1 and 2 of the objective optical system 8 for optical recording media of the present invention will now be set forth in detail.

EMBODIMENT 1

FIGS. 1A-1D are schematic diagrams that depict cross-sectional views of the objective optical system 8 for optical recording media of Embodiment 1 of the present invention, with FIG. 1A showing the operation of the objective optical system when used with a first optical recording medium 9a, with FIG. 1B showing the operation of the objective optical system when used with a second optical recording medium 9b, with FIG. 1C showing the operation of the objective optical system when used with a third optical recording medium 9c, and with FIG. 1D showing the operation of the objective optical system when used with a fourth optical recording medium 9d. As shown in FIGS. 1A-1D, the objective optical system of Embodiment 1 is formed of, in order from the light source side, the variable refractive power element 18, the diffractive optical element $L_1$, and the objective lens $L_2$.

The variable refractive power element 18 has a liquid crystal area that includes multiple concentric zones Z1 to Z5 around the optical axis as shown in FIG. 2. When voltage is applied, the liquid crystal area is changed so as to have positive overall refractive power as a whole, and therefore, the variable refractive power element 18 serves as a converging lens. When no voltage is applied, it serves as a simple transparent plate having no refractive power. In other words, when the variable refractive power element 18 has no voltage applied, it serves as a transparent plate having no refractive power in recording or reproducing information on the AOD 9a, the DVD 9b, and the CD 9c. On the other hand, when the variable refractive power element 18 has a voltage applied, it serves as a converging lens in recording or reproducing information on the BD 9d.

In this way, by changing the refractive properties of the liquid crystal area, the variable refractive power element 18 exhibits different light convergences between the operating beams for the AOD 9a, the DVD 9b, and the CD 9c and the operating beam for the BD 9d.

The diffractive optical element $L_1$ has positive refractive power as a whole and has a diffractive optical surface that includes a diffractive optical element structure on a virtual plane on the light source side and a convex and rotationally symmetric aspheric surface on the optical recording media side. The objective lens $L_2$ is a biconvex lens having positive refractive power and has rotationally symmetric aspheric surfaces both on the light source side and on the optical recording media side.

The diffractive surface is defined by the phase function $\Phi$ defined by Equation (A) above and the rotationally symmetric aspheric surfaces are defined by Equation (B) above. The diffractive surface is formed with a cross-sectional configuration of concentric serrations that define a grating.

The objective optical system 8 for optical recording media successfully focuses the operating beams of wavelengths $\lambda1=408$ nm, $\lambda2=658$ nm, $\lambda3=784$ nm, and $\lambda4=408$ nm onto the recording areas 10a, 10b, 10c, and 10d of the optical recording media 9, that is, the optical recording media AOD 9a, DVD 9b, CD 9c, and BD 9d, respectively, as shown in FIGS. 1A-1D. The radii of curvature R and surface spacings or distances D shown in FIG. 1A are omitted in FIGS. 1B-1D in order to simplify the figures, as is similarly done in FIGS. 5A-5D.

The objective optical system 8 for optical recording media is an infinite conjugate optical system with each of the operating beams entering as collimated or nearly collimated light. Only one operating beam at a time is used according to the optical recording medium 9 being used. The distance $D_2$ between the diffractive optical element $L_1$ and the objective lens $L_2$ in the objective optical system 8 for optical recording media is changeable so that it is made smaller in recording and reproducing information on the CD 9c. The objective optical system 8 for optical recording media of Embodiment 1 can focus the operating beams for four types of optical recording media 9 on desired positions while suppressing spherical aberration.

EMBODIMENT 2

Figure 5B:
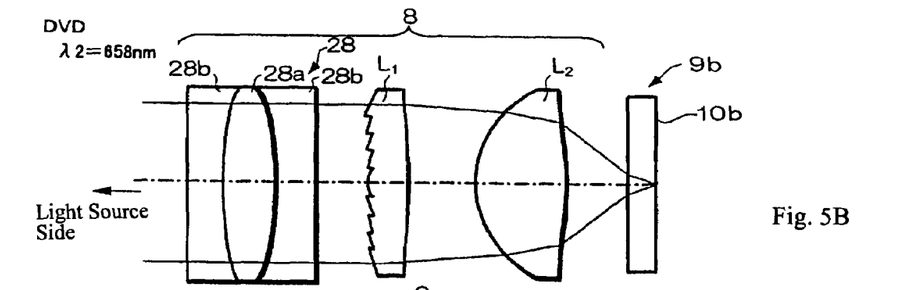
Figure 5C:
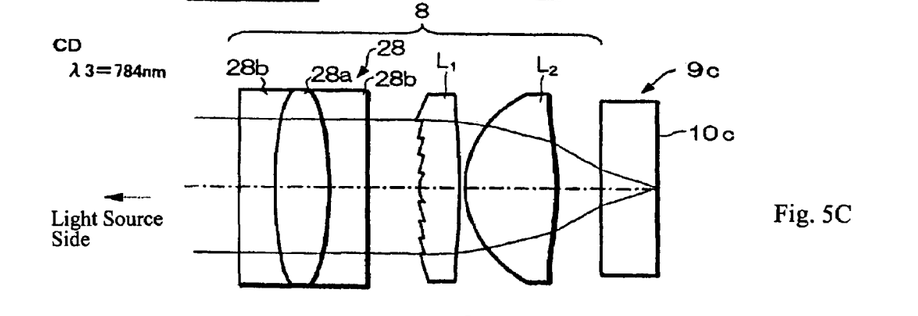
Figure 5D:
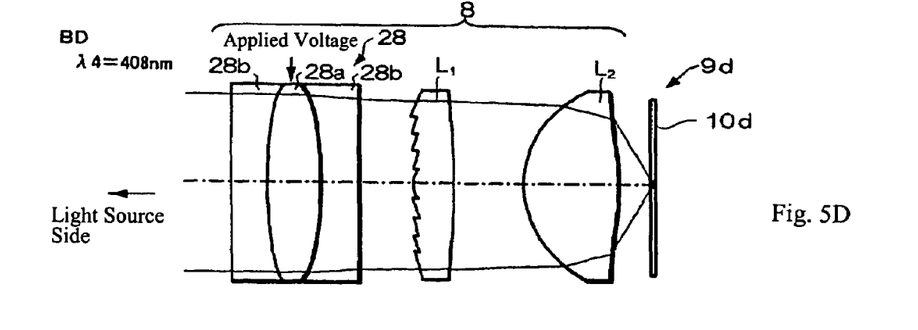

FIGS. 5A-5D are schematic diagrams that depict cross-sectional views of the objective optical system 8 for optical recording media of Embodiment 2 of the present invention, with FIG. 5A showing the operation of the objective optical system when used with a first optical recording medium 9a, with FIG. 5B showing the operation of the objective optical system when used with a second optical recording medium 9b, with FIG. 5C showing the operation of the objective optical system when used with a third optical recording medium 9c, and with FIG. 5D showing the operation of the objective optical system when used with a fourth optical recording medium 9d. As shown in FIGS. 5A-5D, the objective optical system for optical recording media of Embodiment 2 is formed of, in order from the light source side, a variable refractive power element 28, the diffractive optical element $L_1$, and the objective lens $L_2$. The objective lens $L_2$ of this embodiment is identical to the objective lens $L_2$ of Embodiment 1. In FIGS. 5A-5D, the same reference symbols are used for optical elements and optical recording media that are the same, or are illustrated in the same manner as in FIGS. 1A-1D, and further explanation of these elements and these media will be omitted.

The variable refractive power element 28 includes a nanoparticle dispersion 28a of microparticles (having a particle size of several nanometers or smaller and termed nanoparticles) in a specific liquid between two transparent media 28b, 28b arranged along the optical axis of the objective optical system. The nanoparticle dispersion 28a of microparticles is not a solution of microparticles in a liquid, but rather a liquid in which microparticles are uniformly mixed. By switching on and off the voltage applied to the nanoparticle dispersion 28a, the electrophoresis of nanoparticles in the nanoparticle dispersion 28a is changed, whereby the refractive index and, accordingly, the refractive power of the nanoparticle dispersion 28a is changed.

When the operating beams of the AOD 9a, DVD 9b, and CD 9c enter the variable refractive power element 28, no voltage is applied to the variable refractive power element 28. Thus the refractive index of the nanoparticle dispersion 28a is unchanged. At this time, the difference in refractive index between the nanoparticle dispersion 28a and the transparent media 28b, 28b is nearly zero. Therefore, the incident light proceeds undeflected through the variable refractive power element 28 so that, for example, collimated light that enters the variable refractive power element 28 also exits as collimated light. On the other hand, when the operating light beam of the BD 9d enters the variable refractive power element 28, a voltage is applied to the variable refractive power element 28 and the refractive index of the nanoparticle dispersion 28a is increased. Then, a difference in the refractive index between the nanoparticle dispersion 28a and the transparent media 28b, 28b occurs and, therefore, the incident light beam converges. In this way, the refractive power of the variable refractive power element 28 is changed between the operating light beams of the AOD 9a, the DVD 9b, and the CD 9c, and the operating light beam of the BD 9d. This change in refractive power is used to successfully focus the operating beams on the recording area 10 of the respective optical recording media 9.

The objective optical system 8 for optical recording media of Embodiment 2 can successfully focus the operating light beams for four different types of optical recording media 9 on desired positions. The objective optical system for optical recording media of the present invention is not restricted to those described above and various modifications can be made. The optical pickup apparatus of the present invention can be similarly modified in various ways.

For example, the objective optical system for optical recording media of the present invention is applied to at least two types of optical recording media working with light beams of wavelengths that are the same or very nearly the same in recording or reproducing information, and with optical recording media having differences in substrate thicknesses. However, the objective optical system for optical recording media of the present invention can be applied to three or more such optical recording media by changing the refractive power of the variable refractive power element among multiple values. In addition, the number of types of optical recording media is not restricted when it is applied to optical recording media that work with operating beams of wavelengths different from each other.

In the embodiments described above, the operating light beams are incident on the variable refractive power element as collimated light beams. However, the incident operating light beam for one or several types of optical recording media can be diverging or converging light beams.

As shown in FIGS. 5A-5D, the variable refractive power element 28 of Embodiment 2 includes, on the light source side, a plano-concave transparent medium 28b with the concave surface on the optical recording media side, a nanoparticle dispersion 28a that is biconvex as a whole, and a plano-concave transparent medium 28b with the concave surface on the light source side. However, it is not restricted thereto, and can include, arranged from the light source side, a plano-convex transparent medium 28b with the convex surface on the optical recording media side, a nanoparticle dispersion 28a that is biconcave as a whole, and a plano-convex transparent medium 28b with the convex surface on the light source side. The interface is not restricted to a spherical surface and can be an aspheric one. The transparent media on the light source and optical recording media sides can be different in shape or made of different materials. Furthermore, the difference in refractive index between the nanoparticle dispersion and the transparent media can be made to be nearly zero when the variable refractive power element 28 has a voltage applied rather than when a voltage is not applied.

Additionally, the nanoparticle dispersion 28a can be a nanoparticle dispersion for which the refractive index decreases when a voltage is applied to it. Also, the variable refractive power element 28 can have a curved light incident surface and/or a curved light exit surface.

Figure 6A:
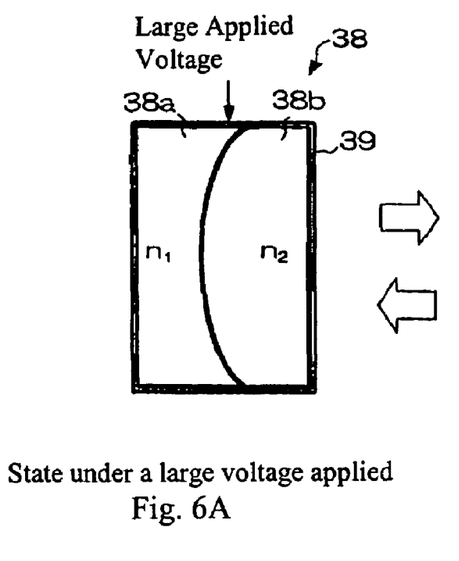
FIGS. 6A-6B are schematic diagrams of an alternative embodiment of the variable refractive power element of the objective optical system for optical recording media of Embodiment 1.
Figure 6B:
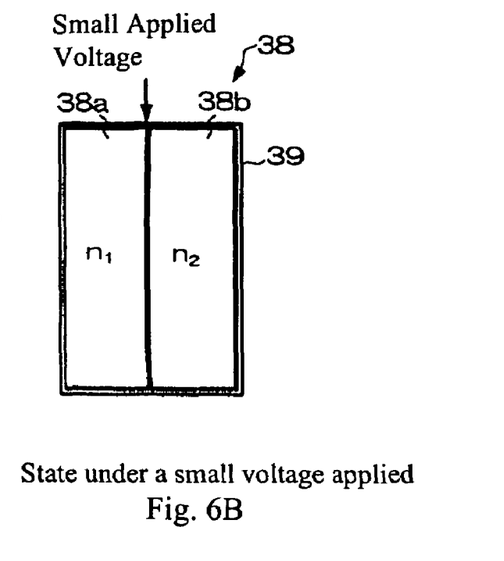

Furthermore, the variable refractive power element of the objective optical system for optical recording media of the present invention can be embodied in various modified forms besides the embodiments described above. For example, as shown in FIGS. 6A-6B, a variable refractive power element 38 is formed as a two-liquid lens element in which a conductive aqueous liquid 38a with refractive index $n_1$ and a non-conductive oily liquid 38b with refractive index $n_2$ (the refractive indices being different from each other) are sealed in a cylindrical container 39 having transparent axial end faces, and the refractive power of the variable refractive power element 38 is changeable by applying or not applying a voltage to the container 39 that changes the profile of the interface between the aqueous liquid and the oily liquid according to the light beam being used. In particular, the refractive power can be changed due to changes in surface tension by switching the voltage applied to the container 39. This type of variable refractive power element 38 can be, for example, a FLUIDFOCUS (Philips Electronics of the Netherlands) lens.

As an example of such a variable refractive power element 38, for the operating light beams of the same wavelength or very nearly the same wavelength for the AOD 9a and BD 9d, a larger voltage may be applied so that the variable refractive power element 38 is used in the state shown in FIG. 6A in recording or reproducing information on one of the AOD 9a and the BD 9d, and a smaller voltage is applied so that the variable refractive power element 38 is used in the state shown in FIG. 6B in recording or reproducing information on the other. The beam converges within the variable refractive power element 38 in the state of FIG. 6A where a larger voltage is applied while the light beam proceeds nearly straight within the variable refractive power element 38 in the state of FIG. 6B where a smaller voltage is applied in the case where the operating beam enters from the left and the refractive index $n_1$ is less than the refractive index $n_2$.

Using the difference in refractive power in association with the change in profile of the interface within the variable refractive power element 38, the operating light beams can be successfully focused on the recording area 10 of different optical recording media 9. As for the other optical recording media 9, such as the DVD 9b and CD 9c, the operating light beams can be successfully focused on the recording area of the respective optical recording media 9 as in the embodiments described above.

Additionally, the profile of the interface between the aqueous liquid 38a and the oily liquid 38b and the relative magnitudes of their refractive indices can be modified as appropriate.

Figure 7A:
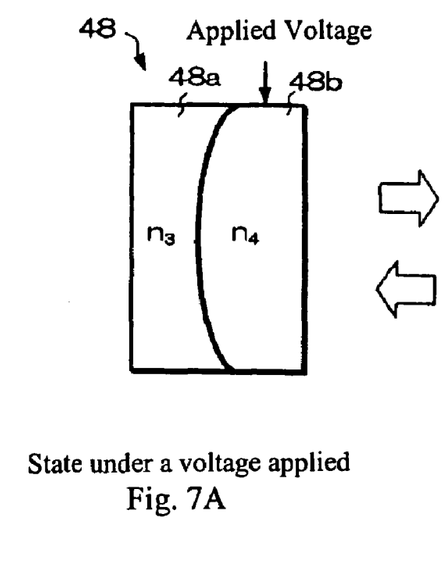
FIGS. 7A-7B are schematic diagrams of a second alternative embodiment of the variable refractive power element of the objective optical system for optical recording media of Embodiment 1.
Figure 7B:
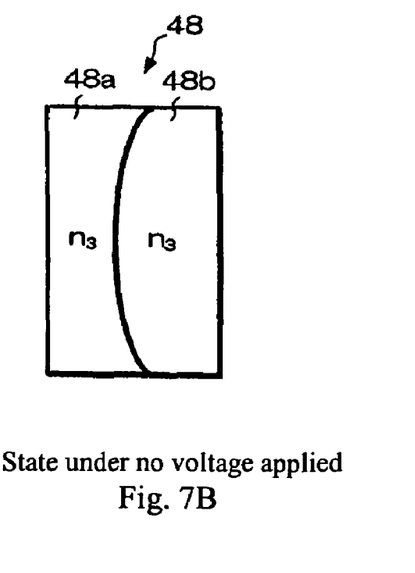

Alternatively, as shown for example in FIGS. 7A and 7B, a variable refractive power element 48 formed of a liquid crystal lens element can be used in which two liquid crystal regions 48a and 48b are arranged along the optical axis of the objective optical system and joined at a curved surface that is symmetrical about the optical axis, and a voltage is applied to one of the liquid crystal regions 48a and 48b so as to change the refractive index of one of the liquid crystal regions 48a and 48b, whereby the refractive power is changed according to the operating light beam being used.

For example, for operating light beams of the same wavelength or very nearly the same wavelength used for the AOD 9a and the BD 9d, a voltage is applied so that the variable refractive power element 48 is used in the state shown in FIG. 7A in recording or reproducing information on one of the AOD 9a and the BD 9d and no voltage is applied so that the variable refractive power element 48 is used in the state shown in FIG. 7B in recording or reproducing information on the other. The light beam converges within the variable refractive power element 48 in the state of FIG. 7A where a voltage is applied while the beam proceeds nearly straight through within the variable refractive power element 48 in the state of FIG. 7B where no voltage is applied, provided that the operating light beam enters from the left, the interface between the liquid crystal regions 48a and 48b is convex on the light source side, both liquid crystal regions 48a and 48b have a refractive index $n_3$ when no voltage is applied, and the liquid crystal region 48b has an increased refractive index $n_4$ when a voltage is applied.

Using the change in refractive power of the variable refractive power element 48 associated with the change in the refractive index of a part of the variable refractive power element 48, the operating light beams can be successfully focused on the recording area 10 of the respective optical recording media 9. As for the other optical recording media 9, such as the DVD 9b and the CD 9c, the operating light beams can be successfully focused on the recording area of the respective optical recording media 9 as in the embodiments described above.

The profile of the interface between the liquid crystal regions 48a and 48b and the relative magnitudes of their refractive indices can be modified as appropriate. Additionally, one of the liquid crystal regions 48a and 48b can be made of a transparent material other than a liquid crystal material.

The objective optical system for optical recording media of the present invention can have a diffractive surface on any lens surface. Additionally, the diffractive surface can be on a convex or concave surface having a refractive power and the convex or concave surface can be spherical or aspheric. The diffractive optical element in the embodiments described has a rotationally symmetric aspheric surface on the side opposite to the diffractive optical surface. Instead, a flat or spherical surface or a non-rotationally symmetric aspheric surface may be provided. For example, the diffractive surface may be on a surface having refractive power and the other surface may be a flat surface. The diffractive optical element may have diffractive surfaces on both sides.

Ideally, the diffractive surface of the objective optical system diffracts as nearly as possible one hundred percent of the incident light as the light for focusing, with one hundred percent defining perfect efficiency. The structure of the diffractive surface is not restricted to a serrated cross-section and may have, for example, a stepped cross-section. Also, structures in which no lens groups include a diffractive surface may be used.

Also, the objective lens of the objective optical system for optical recording media is not restricted to one having a rotationally symmetric aspheric surface both on the light source side and on the optical recording media side as in the embodiments described above, and it may have, for example, flat, spherical, or aspheric surfaces as appropriate.

Other optical recording media, for example those using shorter wavelengths as the operating light beam wavelengths, may be developed in the future. The present invention can be applied to such media. In such a case, it is preferable that the lens be made of a material exhibiting an excellent transmittance for the operating beam wavelength. For example, the lenses of the objective optical system for optical recording media of the present invention can be made of fluorite or quartz.

The order from the light source side of the variable refractive power element and all or portions of the objective lens system is not restricted in the objective optical system for optical recording media of the present invention. Configurations in which the variable refractive power element can be provided between lenses of the objective optical system or on the optical recording media side of the objective optical system are not excluded.

The optical pickup device of the present invention is characterized by the fact that any of the objective optical systems for optical recording media of the embodiments described above can be used. The optical pickup devices of the embodiments described above have three light sources emitting light beams of wavelengths different from each other. However, one light source emitting two light beams of two different wavelengths through adjacent openings can be used. In such a case, for example, one prism can be used instead of the prisms 2a and 2b in FIG. 3. Furthermore, one light source emitting all the light beams of wavelengths to be used can be used. In such a case, the prisms 2a and 2b in FIG. 3, for example, are unnecessary.

Individual light sources can be independently provided for the optical recording media 9 working with the operating light beams of the same wavelength or very nearly the same wavelength, for example, the light beams used for the AOD 9a and BD 9d.

Furthermore, when individual light sources emitting the operating beams of the AOD 9a and BD 9d are provided, the light beams emitted from the light sources do not need to have exactly the same wavelength and can be slightly different in wavelength.

In the optical pickup device of the present invention, a diaphragm or a wavelength selective aperture control element can be provided on the light source side of the objective optical system. Alternately, the variable refractive power element 18, 28, 38, or 48, diffractive optical element $L_1$, or objective lens $L_2$ can have an aperture control function.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective optical system for focusing light from a light source onto at least two different types of optical recording media having different substrate thicknesses in order to record information on or reproduce information from the at least two different types of optical recording media, wherein the objective optical system comprises:

a variable refractive power element with refractive power that may be varied so that the objective optical system can focus light beams having the same or very nearly the same wavelength onto said at least two different types of optical recording media having different substrate thicknesses in order to record information on or reproduce information from the at least two different types of optical recording media; and an objective lens;

wherein the refractive power of said variable refractive power element may be varied so as to compensate for differences in spherical aberration of the objective optical system for foci of the light focused on said at least two different types of optical recording media due to their different substrate thicknesses;

said variable refractive power element comprises a two-liquid lens element that includes a conductive aqueous liquid and a non-conductive oily liquid that have refractive indices different from each other and are sealed in a cylindrical container having transparent axial end faces; and the refractive power of said variable refractive power element is changeable by changing a voltage applied to said container that changes the profile of the interface between said aqueous liquid and said oily liquid according to the light beam being focused.

2. An optical pickup device that includes the objective optical system of claim 1.

3. An objective optical system for focusing light from a light source onto at least two different types of optical recording media having different substrate thicknesses in order to record information on or reproduce information from the at least two different types of optical recording media, wherein the objective optical system comprises:

a variable refractive power element with refractive power that may be varied so that the objective optical system can focus light beams having the same or very nearly the same wavelength onto said at least two different types of optical recording media having different substrate thicknesses in order to record information on or reproduce information from the at least two different types of optical recording media; and an objective lens;

wherein the refractive power of said variable refractive power element may be varied so as to compensate for differences in spherical aberration of the objective optical system for foci of the light focused on said at least two different types of optical recording media due to their different substrate thicknesses;

the objective optical system has a light source side and a recording media side opposite the light source side;

said variable refractive power element is on the light source side of the objective lens;

said variable refractive power element comprises a two-liquid lens element that includes a conductive aqueous liquid and a non-conductive oily liquid that have refractive indices different from each other and are sealed in a cylindrical container having transparent axial end faces;

the refractive power of said variable refractive power element is changeable by changing a voltage applied to said container that changes the profile of the interface between said aqueous liquid and said oily liquid according to the light beam being focused; and the objective optical system is constructed so as to focus light onto at least four different types of optical recording media.

4. An optical pickup device that includes the objective optical system of claim 3.

* * * * *